Patented June 1, 1954

2,680,116

UNITED STATES PATENT OFFICE 2,680,116

PIPERIDIONES AND PROCESS FOR THE MANUFACTURE THEREOF

Heinrich Frick and August Hans Lutz, Basel, Switzerland, assignors to Hoffmann-La Roche Inc., Nutley, N. J., a corporation of New Jersey No Drawing. Application September 16, 1952, Serial No. 309,944

Claims priority, application Switzerland October 5, 1951

5 Claims. (Cl. 260—294.7)

The invention provides novel piperidiones of the general formula

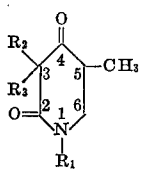

wherein $R_1$ stands for hydrogen or a methyl group and $R_2$ and $R_3$ stand for lower alkyl groups. In contradistinction to analogous compounds, which do not contain any methyl group in the 5-position, the above defined novel compounds are powerful narcotics with prolonged action. These novel compounds are colorless, some of them are solid whereas others are liquid; they are easily soluble in water and in the usual organic solvents and may be distilled under reduced pressure without being decomposed. The new drugs may be used therapeutically.

The invention further provides a process for the manufacture of the said novel compounds which comprises reacting a 2,4-dioxo-3,3-dialkyl-piperidine or the N-methyl derivative thereof with a formic acid ester in the presence of an alkali metal and reducing the 2,4-dioxo-3,3-dialkyl-5-oxymethylene-piperidine or the N-methyl derivative thereof formed to produce the 2,4-dioxo-3,3-dialkyl-5-methyl-piperidine or the N-methyl derivative of the latter. An alternative method for the production of the said novel compounds comprises reacting the intermediate oxymethylene compound mentioned in the foregoing sentence with ammonia or monoalkyl or dialkyl amines to form the corresponding aminomethylene or monoalkyl or dialkyl aminomethylene compound and subjecting the latter to a reduction.

Example 1

24 parts by weight of powdered sodium are suspended in 100 parts by volume of absolute benzene and to this suspension is added a freshly prepared solution of 150 parts by weight of methyl formate and 165 parts by weight of 2,4-dioxo-3,3-diethyl-piperidine in 900 parts by volume of absolute benzene. By cooling with cold water, the temperature is maintained at 25–28° C. After having stirred for 12 hours 200 parts by volume of 0.6 N-sodium hydroxide are added while cooling. The aqueous layer is separated and acidified to congo reaction by means of 35% hydrochloric acid. The 2,4-dioxo-3,3-diethyl-5-oxymethylene-piperidine is precipitated in good yield as a solid. After having been recrystallized in chloroform/petroleum ether it melts at 140–141° C.

5 parts by weight of 2,4-dioxo-3,3-diethyl-5-oxymethylene-piperidine are hydrogenated in 25 parts by volume of methanol in the presence of about 2 parts by weight of Raney nickel at 120° C. and under an elevated pressure of 100 atm. Once 2 mol of hydrogen are absorbed, the hydrogenation is interrupted, the solution is separated from the catalyst and concentrated and the residue is distilled in vacuo. The distillate, boiling between 178 and 185° C. under a pressure of 16 mm., consists of 2,4-dioxo-3,3-diethyl-5-methyl-piperidine, which melts at 74–75° C.

The same compound is obtained when proceeding according to the following alternative procedure: A mixture of 39.4 parts by weight of 2,4-dioxo-3,3-diethyl-5-oxymethylene-piperidine and 27 parts by weight of dibutylamine are heated to 150° C. in a closed vessel. The 2,4-dioxo-3,3-diethyl-5-dibutylamino-methylene-piperidine formed melts at 77° C. after having been recrystallized in petroleum ether. 31 parts by weight of the latter compound are hydrogenated in 150 parts by volume of alcohol, containing 6 parts by weight of acetic acid, in the presence of 10 parts by weight of Raney nickel, at 120° C. and under an elevated pressure of 100 atm. The catalyst is separated and the solution is distilled in vacuo. The 2,4-dioxo-3,3-diethyl-5-methyl-piperidine boils between 178 and 185° C. under a pressure of 16 mm. and melts at 74–75° C.

Example 2

A solution of 20 parts by weight of 2,4-dioxo-3,3-di-n-propyl-piperidine and 20 parts by weight of methyl formate in 30 parts by volume of toluene is added dropwise while stirring and cooling to a suspension of 2.5 parts by weight of powdered sodium in 5 parts by volume of toluene. The temperature should not rise above 28° C. After 4 hours, the sodium salt is extracted by means of 30 parts by weight of 0.3 N sodium hydroxide and the solution is adjusted to congo acid reaction by means of 35% hydrochloric acid. The compound which starts to precipitate as an oil soon solidifies. After having been recrystallized in benzene/petroleum ether the 2,4-dioxo-3,3-di-n-propyl-5-oxymethylene-piperidine melts at 103–105° C. By a reduction analogous to that of Example 1, the 2,4-dioxo-3,3-di-n-propyl-5-methyl-piperidine may be obtained therefrom. After recrystallization in benzene/petroleum ether the latter melts at 107° C.

Example 3

To a suspension of 1.2 parts by weight of powdered sodium in 30 parts by volume of toluene is added with stirring a mixture of 8 parts by weight of 2,4-dioxo-1,3,3-trimethyl-piperidine, 7 parts by weight of methyl formate and 10 parts by weight of toluene. After 10 hours' stirring, the mixture is extracted with 8 parts by volume of 0.1 N-sodium hydroxide, whereupon the extract is precipitated by means of 35% hydrochloric acid. The precipitate consists of 2,4-dioxo-1,3,3-trimethyl-5-oxymethylene-piperidine which melts at 111–112° C.

When reducing the above compound, as described in Example 1, there is obtained 2,4-dioxo-1,3,3,5-tetramethyl-piperidine in the form of a colorless water-miscible liquid, which boils at 143° C. under a pressure of 12 mm.

Example 4

24 parts by weight of powdered sodium are suspended in 100 parts by volume of absolute benzene and to this suspension is added a solution of 120 parts by weight of 2,4-dioxo-3-methyl-3-ethyl-piperidine and 100 parts by weight of ethyl formate in 450 parts by volume of absolute benzene. After 16 hours' stirring, the mixture is extracted by means of 200 parts by volume of 0.1 N-sodium hydroxide and the extract is precipitated by means of concentrated hydrochloric acid. The oily precipitate of 2,4-dioxo-3-methyl-3-ethyl-5-oxymethylene-piperidine obtained, is reduced in a manner analogous to that described in Example 1 to form 2,4-dioxo-3,5-dimethyl-3-ethyl-piperidine, which boils at 172–175° C. under a pressure of 19 mm. When it is repeatedly recrystallized in petroleum ether, the compound melts at 97–98° C.

Example 5

12 parts by weight of powdered sodium are suspended in 20 parts by volume of toluene and to this suspension is added a solution of 70 parts by weight of 2,4-dioxo-3,3-dimethyl-piperidine and 200 parts by weight of methyl formate in 2000 parts by volume of toluene. After 20 hours stirring, the mixture is extracted with 150 parts by volume of 0.1 N-sodium hydroxide and the extract is precipitated by means of concentrated hydrochloric acid. The precipitate consists of 2,4-dioxo-3,3-dimethyl-5-oxymethylene-piperidine of melting point 136–137° C. When the latter product is reduced, as described in Example 1, the 2,4-dioxo-3,3,5-trimethyl-piperidine of melting point 111–112° C. is obtained.

We claim:

1. A compound which may be represented by the general formula

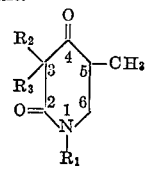

wherein $R_1$ is selected from the group consisting of hydrogen and a methyl group, and $R_2$ and $R_3$ stand for lower alkyl radicals.

2. 2,4-dioxo-3,3-diethyl-5-methyl-piperidine.

3. A process of making a compound having the formula

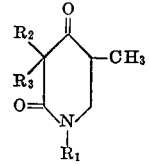

wherein $R_1$ is selected from the group consisting of hydrogen and a methyl group, and $R_2$ and $R_3$ stand for lower alkyl radicals which comprises reacting a compound having the formula

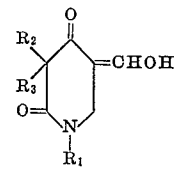

wherein $R_1$, $R_2$ and $R_3$ have the same meaning as above with hydrogen in the presence of a hydrogenation catalyst.

4. A process of making a compound having the formula

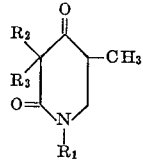

wherein $R_1$ is selected from the group consisting of hydrogen and a methyl group, and $R_2$ and $R_3$ stand for lower alkyl radicals which comprises reacting a compound having the formula

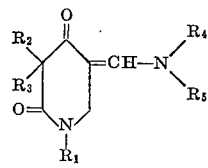

wherein $R_1$, $R_2$ and $R_3$ have the same meaning as above; and $R_4$ and $R_5$ are selected from the group consisting of hydrogen and a lower alkyl group with hydrogen in the presence of a hydrogenation catalyst.

5. 2,4-dioxo-3,3-di-n-propyl-5-methyl-piperidine.

References Cited in the file of this patent

UNITED STATES PATENTS

| Number | Name | Date |
|---|---|---|
| 2,151,047 | Preiswerk et al. | Mar. 21, 1939 |
| 2,525,231 | Masset | Oct. 10, 1950 |

FOREIGN PATENTS

| Number | Country | Date |
|---|---|---|
| 653,307 | Germany | Nov. 22, 1937 |